US012155115B2

(12) United States Patent
Hyun et al.

(10) Patent No.: US 12,155,115 B2
(45) Date of Patent: Nov. 26, 2024

(54) ELECTRONIC DEVICE INCLUDING ANTENNA ASSEMBLY

(71) Applicant: Samsung Electronics Co., Ltd., Suwon-si (KR)

(72) Inventors: Yonghwan Hyun, Suwon-si (KR); Jaehyun Kwon, Suwon-si (KR); Jongmin Kim, Suwon-si (KR); Yangtack Oh, Suwon-si (KR); Seongeun Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 17/941,366

(22) Filed: Sep. 9, 2022

(65) Prior Publication Data

US 2023/0115226 A1 Apr. 13, 2023

Related U.S. Application Data

(63) Continuation of application No. PCT/KR2022/009106, filed on Jun. 27, 2022.

(30) Foreign Application Priority Data

Sep. 23, 2021 (KR) ........................ 10-2021-0125479

(51) Int. Cl.

| | |
|---|---|
| ***H01Q 1/38*** | (2006.01) |
| ***H01Q 1/24*** | (2006.01) |
| ***H01Q 5/328*** | (2015.01) |

(52) U.S. Cl.

CPC ............... *H01Q 1/243* (2013.01); *H01Q 1/38* (2013.01); *H01Q 5/328* (2015.01)

(58) Field of Classification Search

CPC ........... H01Q 1/243; H01Q 5/328; H01Q 1/38

See application file for complete search history.

(56) References Cited

U.S. PATENT DOCUMENTS

| | | | |
|---|---|---|---|
| 2019/0081396 A1 | 3/2019 | Zhou et al. |
| 2019/0165478 A1 | 5/2019 | Jo et al. |
| 2019/0214714 A1 | 7/2019 | Chen et al. |
| 2019/0214727 A1 | 7/2019 | Mikawa et al. |

(Continued)

FOREIGN PATENT DOCUMENTS

| | | |
|---|---|---|
| CN | 112002993 A | 11/2020 |
| CN | 112886224 A | 6/2021 |

(Continued)

OTHER PUBLICATIONS

International Search Report dated Oct. 6, 2022, issued in International Application No. PCT/KR2022/009106.

*Primary Examiner* — Henry Luong

(74) *Attorney, Agent, or Firm* — Jefferson IP Law, LLP

(57) ABSTRACT

An electronic device is provided. The electronic device includes a housing, a circuit board disposed in the housing and receiving a communication module, an antenna assembly disposed in the housing and including an antenna pattern electrically connected with the communication module and a ground pattern, and a conductive plate disposed on the antenna assembly. At least a portion of the ground pattern may be positioned between the antenna pattern and the conductive plate. The conductive plate may be configured to be electrically coupled with the antenna pattern through the ground pattern.

20 Claims, 11 Drawing Sheets

A-A'

(56) References Cited

U.S. PATENT DOCUMENTS

| | | | | |
|---|---|---|---|---|
| 2020/0287572 | A1* | 9/2020 | Tsai | H01Q 5/371 |
| 2020/0343637 | A1 | 10/2020 | Qu | |
| 2021/0098869 | A1 | 4/2021 | Ruaro et al. | |
| 2021/0135362 | A1 | 5/2021 | Hsu et al. | |
| 2022/0311128 | A1 | 9/2022 | Seo et al. | |
| 2023/0352839 | A1 | 11/2023 | Hou et al. | |

FOREIGN PATENT DOCUMENTS

| | | | |
|---|---|---|---|
| JP | 2020-114006 | A | 7/2020 |
| KR | 10-1165919 | B1 | 7/2012 |
| KR | 10-1782951 | B1 | 9/2017 |
| KR | 10-2019-0061936 | A | 6/2019 |
| KR | 10-2021-0079998 | A | 6/2021 |
| WO | 2019/232802 | A1 | 12/2019 |

* cited by examiner

ELECTRONIC DEVICE INCLUDING ANTENNA ASSEMBLY

CROSS-REFERENCE TO RELATED APPLICATION(S)

This application is a continuation application, claiming priority under § 365(c), of an International application No. PCT/KR2022/009106, filed on Jun. 27, 2022, which is based on and claims the benefit of a Korean patent application number 10-2021-0125479, filed on Sep. 23, 2021, in the Korean Intellectual Property Office, the disclosure of which is incorporated by reference herein in its entirety.

TECHNICAL FIELD

The disclosure relates to an electronic device including an antenna assembly. More particularly, the disclosure relates to an electronic device capable of enhancing antenna performance (e.g., antenna gain) using a conductive plate for forming a resonance space of a speaker as a radiator.

BACKGROUND ART

The term "electronic device" may mean a device performing a particular function according to its equipped program, such as a home appliance, an electronic scheduler, a portable multimedia player, a mobile communication terminal, a tablet personal computer (PC), a video/sound device, a desktop PC or laptop computer, a navigation for automobile, or the like. For example, electronic devices may output stored information as voices or images. As electronic devices are highly integrated, and high-speed, high-volume wireless communication becomes commonplace, an electronic device, such as a mobile communication terminal, is recently being equipped with various functions. For example, an electronic device comes with the integrated functionality, including an entertainment function, such as playing video games, a multimedia function, such as replaying music/videos, a communication and security function for mobile banking, and a scheduling and e-wallet function. Such electronic devices become compact enough for users to carry in a convenient way.

The above information is presented as background information only to assist with an understanding of the disclosure. No determination has been made, and no assertion is made, as to whether any of the above might be applicable as prior art with regard to the disclosure.

DISCLOSURE

Technical Problem

The electronic device may communicate with an external electronic device or a server through an antenna. The communication performance of the electronic device may be changed based on the shape or size of the antenna pattern. However, to downsize the electronic device, the size and number of antenna patterns may be limited.

Aspects of the disclosure are to address at least the above-mentioned problems and/or disadvantages and to provide at least the advantages described below. Accordingly, an aspect of the disclosure is to provide an electronic device capable of enhancing antenna performance (e.g., antenna gain) using a conductive plate for forming a resonance space of a speaker as a radiator.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing, a circuit board disposed in the housing and receiving a communication module, an antenna assembly disposed in the housing and including an antenna pattern and a ground pattern electrically connected with the communication module, and a conductive plate disposed on the antenna assembly. At least a portion of the ground pattern may be positioned between the antenna pattern and the conductive plate. The conductive plate may be configured to be electrically coupled with the antenna pattern through the ground pattern.

In accordance with an aspect of the disclosure, an electronic device is provided. The electronic device includes a housing, a circuit board disposed in the housing and receiving a communication module, an antenna assembly disposed in the housing and including an antenna pattern electrically connected with the communication module and a ground pattern spaced apart from the antenna pattern, a speaker module disposed on a first surface of the antenna assembly, and a conductive plate disposed on a second surface, opposite to the first surface, of the antenna assembly and, together with the speaker module, surrounding at least a portion of a resonance space. At least a portion of the ground pattern may be positioned between the antenna pattern and the conductive plate. The conductive plate may be configured to be electrically coupled with the antenna pattern through the ground pattern.

Advantageous Effects

According to various embodiments of the disclosure, the electronic device may enhance antenna performance (e.g., antenna gain) using a conductive plate electrically coupled to an antenna pattern through a ground pattern, as a radiator.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
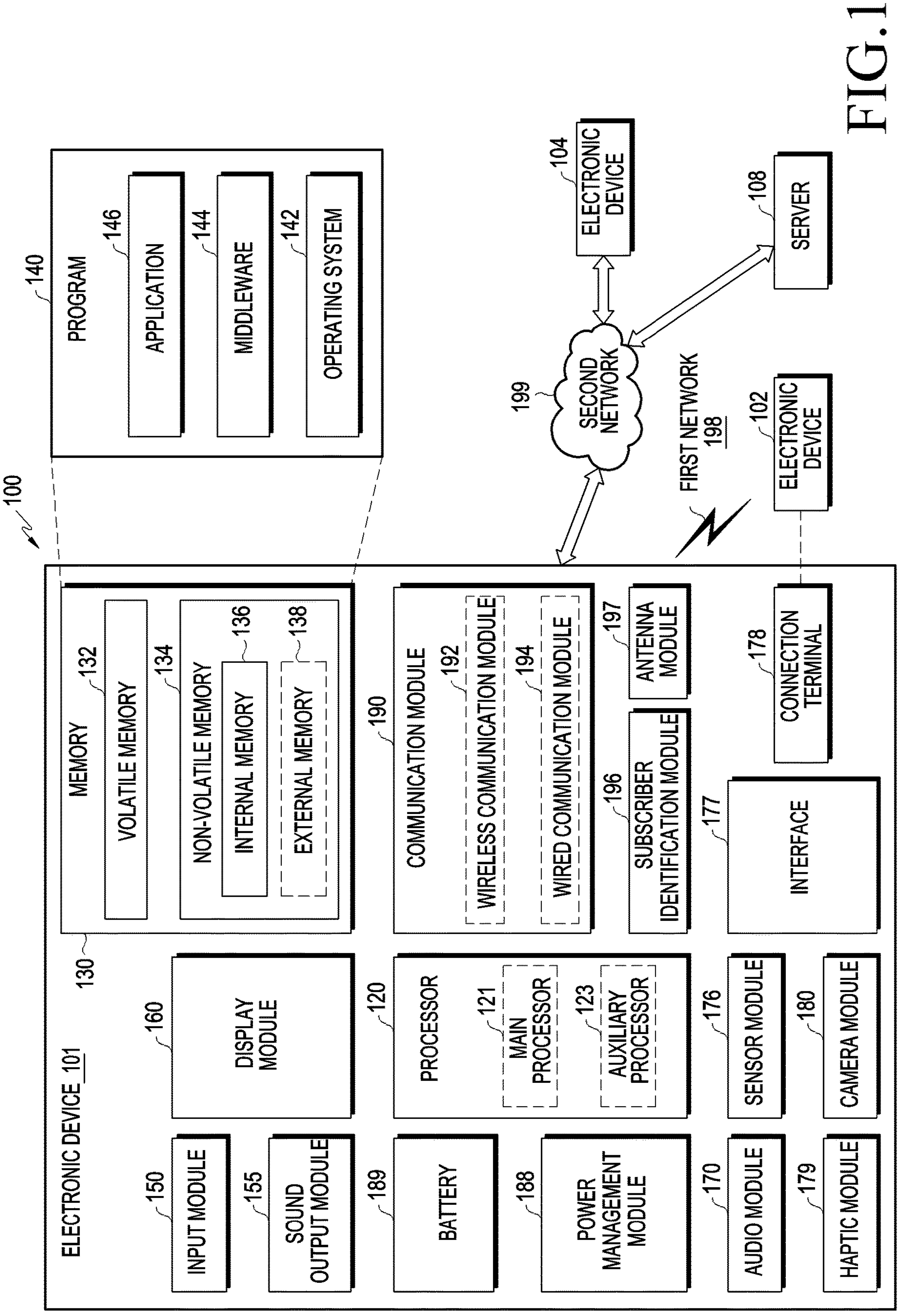
FIG. 1 is a block diagram illustrating an electronic device in a network environment according to an embodiment of the disclosure.

FIG. 1 is a block diagram illustrating an electronic device in a network environment according to an embodiment of the disclosure;

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160). The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network

199, using subscriber information (e.g., international mobile subscriber identity (IMSI)) stored in the subscriber identification module 196.

The wireless communication module 192 may support a 5th generation (5G) network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter (mm) Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
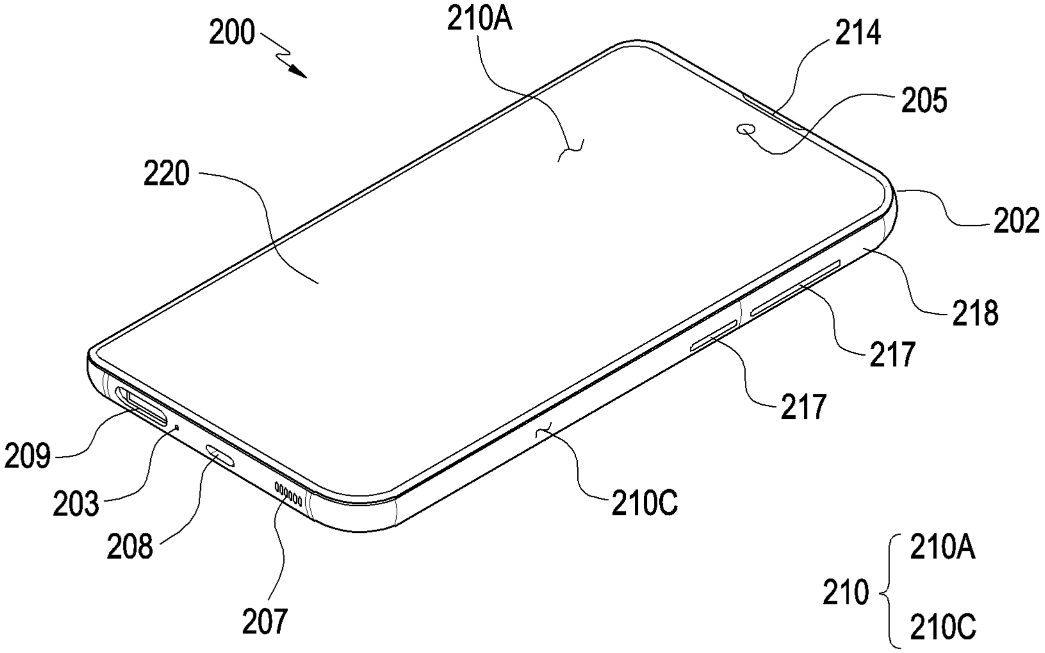
FIG. 2 is a front perspective view illustrating an electronic device according to an embodiment of the disclosure.
Figure 3:
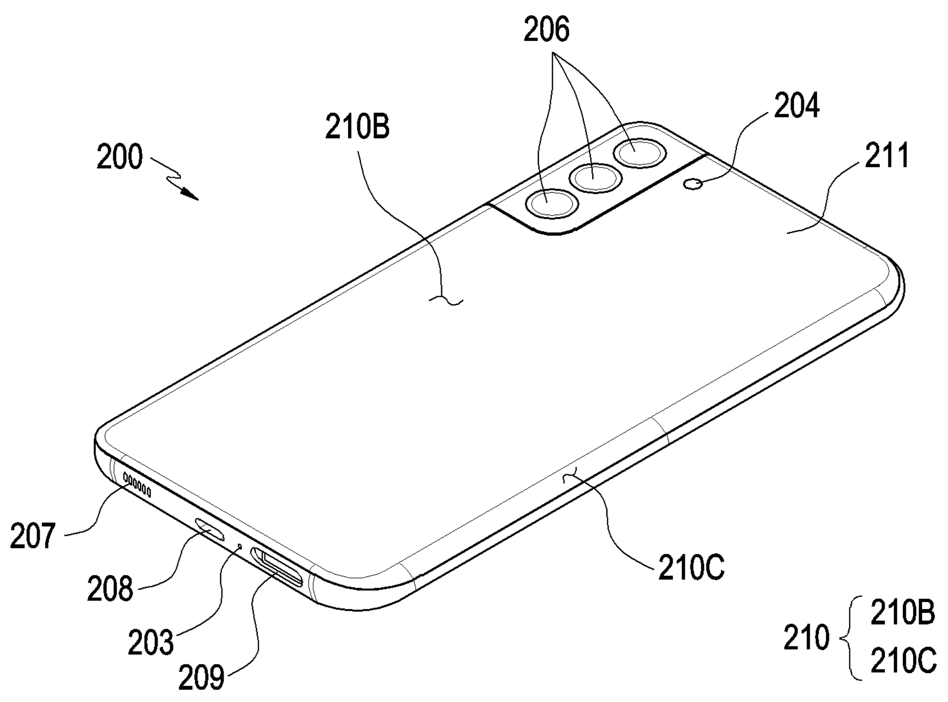
FIG. 3 is a rear perspective view illustrating an electronic device according to an embodiment of the disclosure.

FIG. 2 is a front perspective view illustrating an electronic device according to an embodiment of the disclosure. FIG. 3 is a rear perspective view illustrating an electronic device according to an embodiment of the disclosure.

Referring to FIGS. 2 and 3, according to an embodiment, an electronic device 200 may include a housing 210 with a front surface 210A, a rear surface 210B, and a side surface 210C surrounding a space between the front surface 210A and the rear surface 210B. According to another embodiment (not shown), the housing 210 may denote a structure forming part of the front surface 210A, the rear surface 210B, and the side surface 210C of FIG. 2. For example, the housing 210 may include a front plate 202 and a rear plate 211. According to an embodiment, at least part of the front surface 210A may have a substantially transparent front plate 202 (e.g., a glass plate or polymer plate including various coat layers). The rear surface 210B may be formed by a rear plate 211. The rear plate 211 may be formed of, e.g., glass, ceramic, polymer, metal (e.g., titanium (Ti), stainless steel (STS), aluminum (Al), or magnesium (Mg)), or a combination of at least two thereof. The side surface 210C may be formed by a side bezel structure (or a "side member") 218 that couples to the front plate 202 and the rear plate 211 and includes a metal and/or polymer. According to an embodiment, the rear plate 211 and the side bezel plate 218 may be integrally formed together and include the same material (e.g., glass, metal, such as aluminum, or ceramic). According to another embodiment, the front surface 210A and/or the front plate 202 may be interpreted as a part of the display 220.

According to an embodiment, the electronic device 200 may include at least one of a display 220, audio modules 203, 207, and 214 (e.g., the audio module 170 of FIG. 1), a sensor module (e.g., the sensor module of FIG. 1). 176), camera modules 205 and 206 (e.g., the camera module 180 of FIG. 1), a key input device 217 (e.g., the input module 150 of FIG. 1), and connector holes 208 and 209 (e.g., the connection terminal 178 of FIG. 1). According to an embodiment, the electronic device 200 may exclude at least one (e.g., the connector hole 209) of the components or may add other components. According to an embodiment, the display 220 may be visually exposed through, e.g., a majority portion of the front plate 202.

According to an embodiment, the surface (or the front plate 202) of the housing 210 may include a screen display area formed as the display 220 is visually exposed. For example, the screen display area may include the front surface 210A.

According to another embodiment (not shown), the electronic device 200 may include a recess or opening formed in a portion of the screen display area (e.g., the front surface 210A) of the display 220 and may include at least one or more of an audio module 214, a sensor module (not shown), a light emitting device (not shown), and a camera module 205 aligned with the recess or opening. According to another embodiment (not shown), at least one or more of the audio module 214, a sensor module (not shown), a camera module 205, a fingerprint sensor (not shown), and a light emitting device (not shown) may be included on the rear surface of the screen display area of the display 220.

According to an embodiment (not shown), the display 220 may be disposed to be coupled with, or adjacent, a touch detecting circuit, a pressure sensor capable of measuring the strength (pressure) of touches, and/or a digitizer for detecting a magnetic field-type stylus pen.

In some embodiments, at least a portion of the key input device 217 may be disposed on the side bezel structure 218.

According to an embodiment, the audio modules 203, 207, and 214 may include, e.g., a microphone hole 203 and speaker holes 207 and 214. The microphone hole 203 may have a microphone inside to obtain external sounds. According to an embodiment, there may be a plurality of microphones to be able to detect the direction of a sound. The speaker holes 207 and 214 may include an external speaker hole 207 and a phone receiver hole 214. According to an embodiment, the speaker holes 207 and 214 and the microphone hole 203 may be implemented as a single hole, or speakers may be rested without the speaker holes 207 and 214 (e.g., piezo speakers).

According to an embodiment, the sensor modules (not shown) may generate an electrical signal or data value corresponding to an internal operating state or external environmental state of the electronic device 200. The sensor module (not shown) may include, e.g., a first sensor module (not shown) (e.g., a proximity sensor) and/or a second sensor module (not shown) (e.g., a fingerprint sensor) disposed on the front surface 210A of the housing 210. The sensor module (not shown) may include a third sensor module (not shown) (e.g., a heart rate monitor (HRM) sensor) and/or a fourth sensor module (not shown) (e.g., a fingerprint sensor) disposed on the rear surface 210B of the housing 210). In an embodiment (not shown), the fingerprint sensor may be disposed on the rear surface 210B as well as on the front surface 210A (e.g., the display 220) of the housing 210. The electronic device 200 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor (not shown).

According to an embodiment, the camera modules 205 and 206 may include a front camera module 205 disposed on the first surface 210A of the electronic device 200 and a rear camera module 206 and/or a flash 204 disposed on the rear surface 210B. The camera modules 205 and 206 may include one or more lenses, an image sensor, and/or an image signal processor. The flash 204 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 200.

According to an embodiment, the key input device 217 may be disposed on the side surface 210C of the housing 210. According to another embodiment, the electronic device 200 may exclude all or some of the above-mentioned key input devices 217 and the excluded key input devices 217 may be implemented in other forms, e.g., as soft keys, on the display 220.

According to an embodiment, the light emitting device (not shown) may be disposed on, e.g., the front surface 210A of the housing 210. The light emitting device (not shown) may provide, e.g., information about the state of the electronic device 200 in the form of light. According to another embodiment, the light emitting device (not shown) may provide a light source that interacts with, e.g., the front camera module 205. The light emitting device (not shown) may include, e.g., an LED, an IR LED, and/or a xenon lamp.

According to an embodiment, the connector holes 208 and 209 may include a first connector hole 208 for receiving a connector (e.g., an earphone jack) for transmitting/receiving audio signals to/from an external electronic device or a connector (e.g., a USB connector) for transmitting/receiving power and/or data to/from the external electronic device and/or a second connector hole 209 for receiving a storage device (e.g., a subscriber identification module (SIM) card). According to an embodiment, the first connector hole 208 and/or the second connector hole 209 may be omitted.

Figure 4:
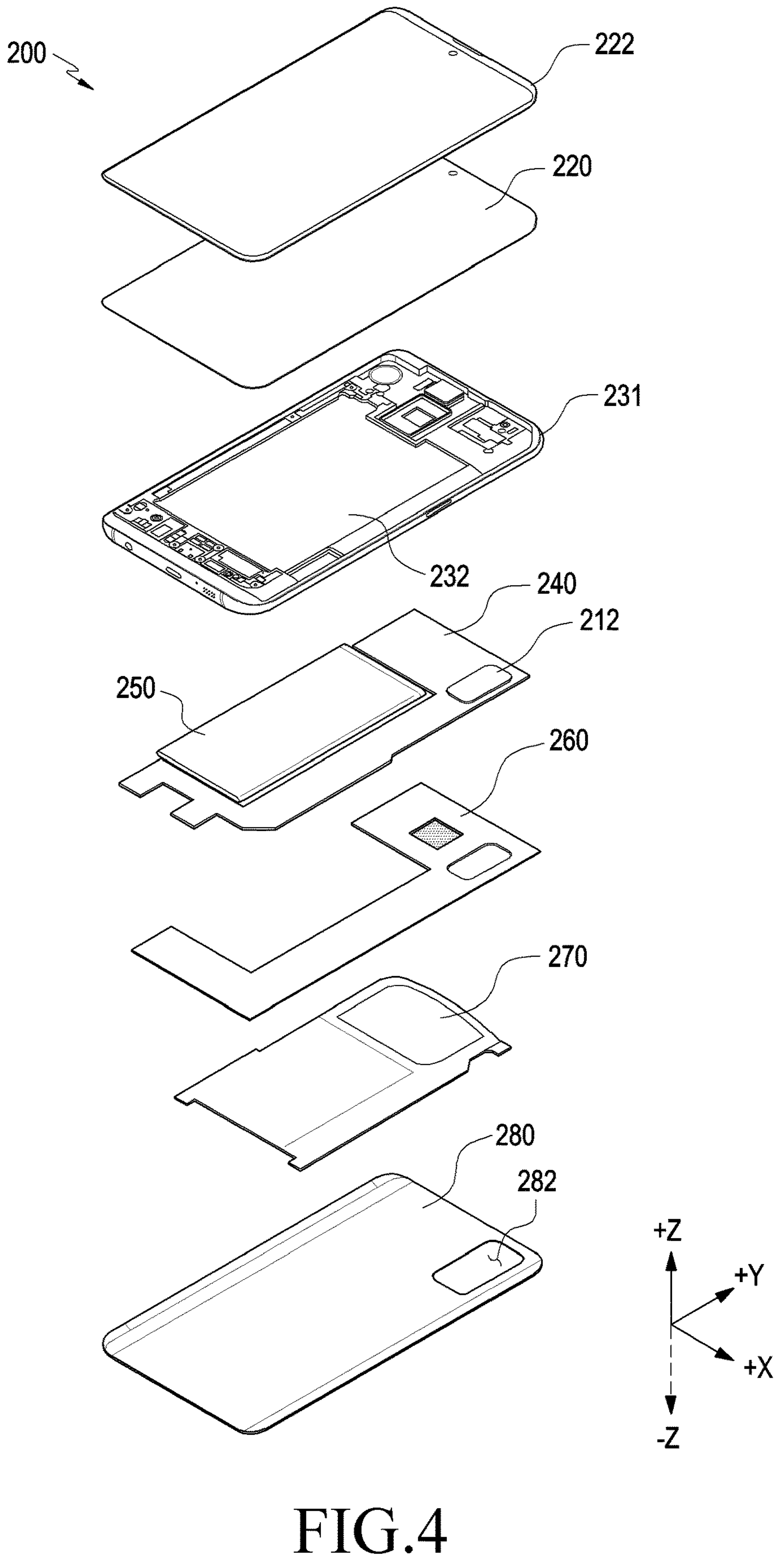
FIG. 4 is an exploded perspective view illustrating an electronic device according to an embodiment of the disclosure.

FIG. 4 is an exploded perspective view illustrating an electronic device according to an embodiment of the disclosure.

Referring to FIG. 4, an electronic device 200 (e.g., the electronic device 200 of FIGS. 2 and 3) may include at least one of a front plate 222 (e.g., the front plate 202 of FIG. 2), a display 220. (e.g., the display 220 of FIG. 2), a bracket 232 (e.g., a front supporting member), a printed circuit board 240, a battery 250, a rear case 260 (e.g., a rear supporting member), an antenna 270, and a rear plate 280 (e.g., the rear plate 211 of FIG. 3). According to an embodiment, the electronic device 200 may exclude at least one (e.g., the rear case 260) of the components or may add other components. At least one of the components of the electronic device 200 may be the same or similar to at least one of the components of the electronic device 200 of FIG. 2 or 3 and no duplicate description is made below.

According to an embodiment, the bracket 232 may be disposed inside the electronic device 200 to be connected with the side bezel structure 231 or integrated with the side bezel structure 231. The bracket 232 may be formed of, e.g., a metal and/or non-metallic material (e.g., polymer). The bracket 232 may receive the display 220 on one surface and the printed circuit board 240 on the other surface. A processor (e.g., the processor 120 of FIG. 1), a memory (e.g., the memory 130 of FIG. 1), and/or an interface (e.g., the interface 177 of FIG. 1) may be mounted on the printed circuit board 240.

According to an embodiment, the battery 250 may be a device for supplying power to at least one component (e.g., the camera module 212) of the electronic device 200. The battery 250 may include, e.g., a primary cell which is not rechargeable, a secondary cell which is rechargeable, or a fuel cell. At least a portion of the battery 250 may be disposed on substantially the same plane as the printed circuit board 240. The battery 250 may be integrally or detachably disposed inside the electronic device 200.

According to an embodiment, the rear case 260 may be disposed between the printed circuit board 240 and the antenna 270. For example, the rear case 260 may include one surface to which at least one of the printed circuit board 240 and the battery 250 is coupled, and another surface to which the antenna 270 is coupled.

According to an embodiment, the antenna 270 may be disposed between the rear plate 280 and the battery 250. The antenna 270 may include, e.g., a near-field communication (NFC) antenna, a wireless charging antenna, and/or a magnetic secure transmission (MST) antenna. The antenna 270 may perform short-range communication with, e.g., an external device or may wirelessly transmit or receive power necessary for charging. For example, the antenna 270 may include a coil for wireless charging. According to an embodiment, an antenna structure may be formed by a portion or combination of the side bezel structure 231 and/or the bracket 232.

According to various embodiments, the electronic device 200 may include a camera module 212 disposed in the second housing (e.g., the housing 210 of FIG. 2). According to an embodiment, the camera module 212 may be disposed on the bracket 232 and may be a rear camera module (e.g., the camera module 212 of FIG. 3) capable of obtaining an image of a subject positioned behind (e.g., the −Z direction) of the electronic device 200. According to an embodiment, at least a portion of the camera module 212 may be exposed to the outside of the electronic device 200 through the opening 282 formed in the rear plate 280.

The electronic device 200 disclosed in FIGS. 2 to 4 has a bar-type or plate-type appearance but the disclosure is not limited thereto. For example, the illustrated electronic device may be a rollable electronic device or a foldable electronic device (e.g., an electronic device 500 of FIG. 12). "Rollable electronic device" may mean an electronic device at least a portion of which may be wound or rolled or received in a housing (e.g., the housing 210 of FIG. 2) as the display (e.g., the display 220 of FIG. 4) may be bent and deformed. As the display is stretched out or is exposed to the outside in a larger area according to the user's need, the rollable electronic device may use an expanded second display area.

Figure 5A:
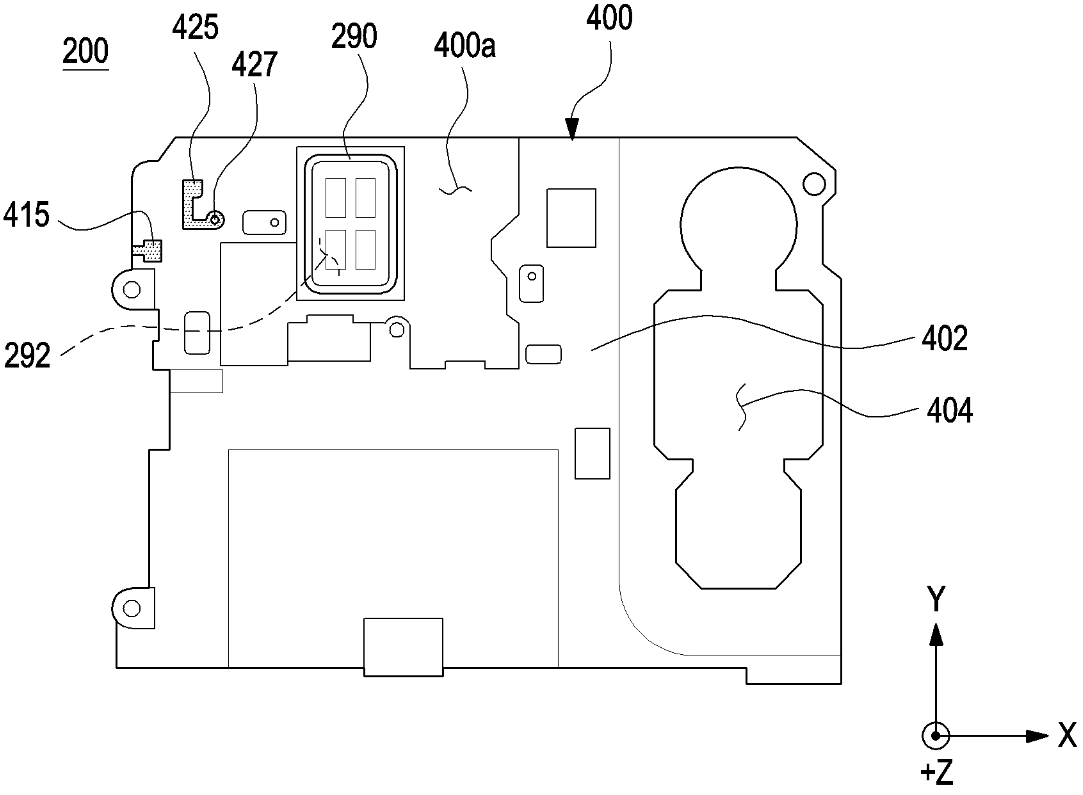
FIG. 5A is a front view illustrating an electronic device including an antenna assembly, according to an embodiment of the disclosure.
Figure 5B:
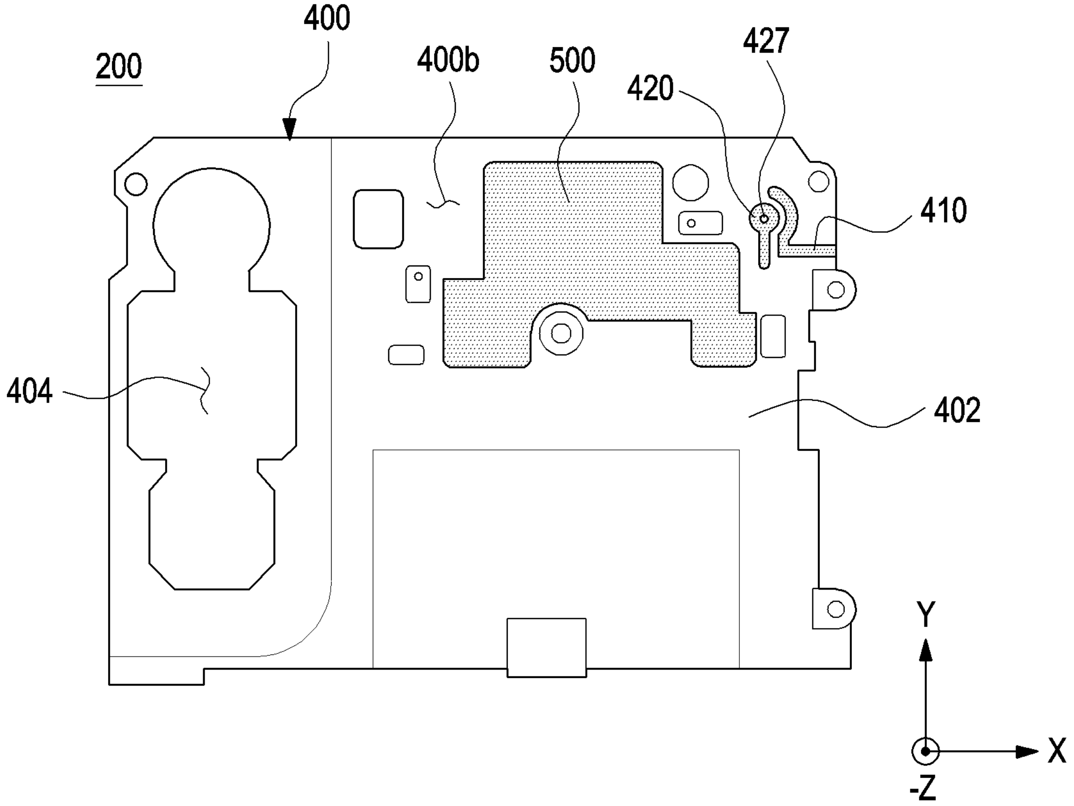
FIG. 5B is a rear view illustrating an electronic device including an antenna assembly and a plate, according to an embodiment of the disclosure.

FIG. 5A is a front view illustrating an electronic device including an antenna assembly, according to an embodiment of the disclosure. FIG. 5B is a rear view illustrating an electronic device including an antenna assembly and a plate, according to an embodiment of the disclosure.

Referring to FIGS. 5A and 5B, an electronic device 200 may include a speaker module 290, an antenna assembly 400, and/or a plate 500. The configuration of the speaker module 290 of FIGS. 5A and/or 5B may be identical in whole or part to the configuration of the audio module 170 of FIG. 1, and the configuration of the antenna assembly 400 of FISG. 5A and/or 5B may be identical in whole or part to the configuration of the antenna module 197 of FIG. 1 and/or the antenna 270 of FIG. 4.

According to various embodiments, the speaker module 290 may convert an electrical signal into sound. For example, the speaker module 290 may include at least one of a vibration plate (e.g., a diaphragm) (not shown), a coil (not shown) configured to vibrate the diaphragm based on pulse width modulation (PWM), a damping member (e.g., a spring) (not shown) formed of a conductive material to transfer a signal (e.g., power) received from the outside of the speaker module 290 to the coil, a magnet (not shown), or a conductive member (not shown) for concentrating the magnetic field generated from the magnet. According to an embodiment, the speaker module 290 may be disposed on the antenna assembly 400. For example, the speaker module 290 may be disposed on a first surface 400a of the antenna assembly 400. According to an embodiment, at least a portion of the sound (or vibration) generated by the speaker module 290 may be transferred to the resonance space 292 facing the speaker module 290.

According to various embodiments, the antenna assembly 400 may be disposed between a circuit board (e.g., the printed circuit board 240 of FIG. 4) and a rear plate (e.g., the rear plate 280 of FIG. 4). For example, the antenna assembly 400 may include a first surface 400a facing the printed circuit board 240 and a second surface 400b facing the rear plate 280. According to an embodiment, the second surface 400b may be opposite to the first surface 400a.

According to various embodiments, the electronic device 200 may communicate with an external electronic device or a server through the antenna assembly 400. For example, the antenna assembly 400 may include an antenna pattern 410. According to an embodiment, the antenna pattern 410 may be electrically connected with a communication module (e.g., the communication module 190 of FIG. 6). For example, the signal generated by the communication module 190 may be transferred to the outside of the electronic device 200 using the antenna pattern 410. The radio signal transferred from the outside of the electronic device 200 may be transferred to the communication module 190 using the antenna pattern 410. According to an embodiment, the antenna pattern 410 may include a conductive material (e.g., metal). For example, the antenna pattern 410 may include copper (Cu), nickel (Ni), aluminum (Al), or stainless steel. According to an embodiment, the antenna pattern 410 may be interpreted as a radiator pattern. According to an embodiment, at least a portion of the antenna pattern 410 may be disposed on the second surface 400b of the antenna assembly 400.

According to various embodiments, the antenna assembly 400 may include a ground pattern 420. According to an embodiment, the ground pattern 420 may provide a reference potential to the antenna assembly 400. For example, the antenna assembly 400 may be electrically connected with the ground of the circuit board (e.g., a circuit board 300 of FIG. 6) using the ground pattern 420. According to an embodiment, the ground pattern 420 may include a conductive material (e.g., metal). For example, the ground pattern 420 may include copper (Cu), nickel (Ni), aluminum (Al), or stainless steel. According to an embodiment, at least a portion of the ground pattern 420 may be disposed on the second surface 400b of the antenna assembly 400.

According to various embodiments, the antenna assembly 400 may include a first connection area 415. According to an embodiment, the first connection area 430 may extend from the antenna pattern 410. For example, the first connection area 415 may be interpreted as a part of the antenna pattern 410 disposed on the first surface 400a of the antenna assembly 400. According to an embodiment, the antenna pattern 410 may extend from the second surface 400b of the antenna assembly 400 through a side surface of the antenna assembly 400 to the first connection area 415 positioned on the first surface 400a of the antenna assembly 400. According to an embodiment, the first connection area 415 may be electrically connected with a first connection part (e.g., a first connection part 310 of FIG. 6) of the circuit board (e.g., the circuit board 300 of FIG. 6). For example, the first connection area 415 may contact the first connection part 310. The radio signal generated by the communication module (e.g., the communication module 190 of FIG. 6) positioned on the circuit board 300 may be transferred through the first connection part 310 and the first connection area 415 to the antenna pattern 410. According to an embodiment, the first connection area 415 may include a conductive material (e.g., a metal). For example, the first connection area 415 may include copper (Cu), nickel (Ni), aluminum (Al), or stainless steel. For example, the electrical signal received from the first antenna pattern 410 may be transferred to the first connection area 415.

According to various embodiments, the antenna assembly 400 may include a second connection area 425. According to an embodiment, the second connection area 425 may extend from the ground pattern 420. For example, the second connection area 425 may be interpreted as a part of the ground pattern 420 disposed on the first surface 400a of the antenna assembly 400. According to an embodiment, the second connection area 425 may be electrically connected with a second connection part (e.g., a second connection part 320 of FIG. 6) of the circuit board (e.g., the circuit board 300 of FIG. 6). For example, the second connection area 425 may contact the second connection part 320. According to an embodiment, the ground pattern 420 may be electrically connected with the ground (not shown) of the circuit board 300 using the second connection part 320. According to an embodiment, the ground pattern 420 may be electrically connected with at least one matching circuit (not shown) positioned in the circuit board 300 using the second connection part 320. According to an embodiment, the second connection area 425 may include a conductive material (e.g., a metal). For example, the second connection area 425 may include copper (Cu), nickel (Ni), aluminum (Al), or stainless steel. According to an embodiment, the antenna assembly 400 may include a through hole 427 formed between the first surface 400a and the second surface 400b of the antenna assembly 400. According to an embodiment, at least a portion of the ground pattern 420 may be disposed on the inner surface of the through hole 427. For example, the ground pattern 420 may be interpreted as a conductive coating or plating layer positioned on the inner side of the through hole 427.

According to various embodiments, the antenna assembly 400 may include a case structure 402 in which the antenna pattern 410 and the ground pattern 420 are positioned. According to an embodiment, the case structure 402 may be formed of a non-metal material. For example, the case structure 402 may include a resin. According to an embodiment, the antenna pattern 410 may be a laser direct structuring (LDS) antenna formed in the case structure 402. For example, at least a portion of the case structure 402 may include a thermoplastic resin (e.g., plastic). The case structure 402 may include a pattern or groove structure formed or processed in the thermoplastic resin using a laser. At least a portion of the antenna pattern 410 may be interpreted as a plating layer or a conductive coating processed on the thermoplastic resin. According to an embodiment, the case structure 402 may include a through hole 404 for receiving a camera module (e.g., the camera module 212 of FIG. 4).

According to various embodiments, the plate 500 may face at least a portion of the speaker module 290. For example, the plate 500, together with the speaker module 290, may surround at least a portion of the resonance space 292.

According to various embodiments, the plate 500 may be disposed on the antenna assembly 400. According to an embodiment, the plate 500 may be disposed on the second surface 400*b* of the antenna assembly 400. According to an embodiment, at least a portion of the plate 500 may be positioned in a direction opposite to the speaker module 290 with respect to the antenna assembly 400.

According to various embodiments, the plate 500 may be formed of a conductive material (e.g., metal). For example, the plate 500 may include at least one of stainless steel, aluminum, copper, or nickel. According to an embodiment, the plate 500 may be formed in a shape different from that of the antenna pattern 410 and/or the ground pattern 420. For example, at least a portion of the plate 500 may be formed in a flat plate shape larger than the size of the speaker module 290. According to an embodiment, the area of the plate 500 may be larger than the area of the antenna pattern 410 or the area of the ground pattern 420.

Figure 6:
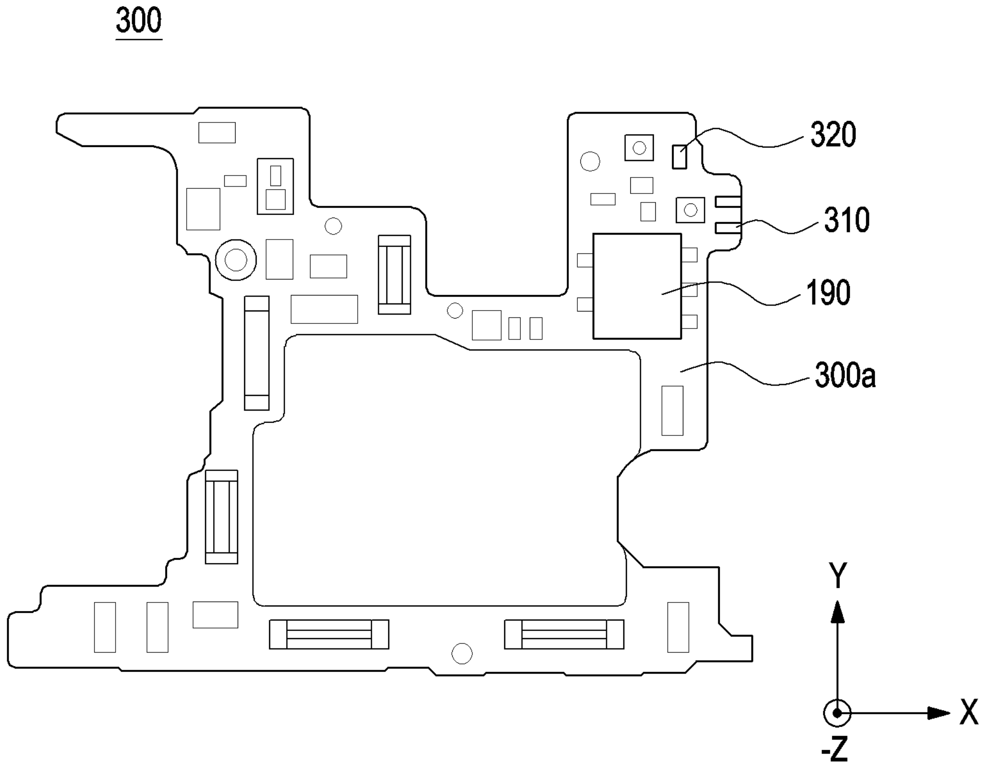
FIG. 6 is a front view illustrating a circuit board according to an embodiment of the disclosure.

FIG. 6 is a front view illustrating a circuit board according to an embodiment of the disclosure.

Referring to FIG. 6, the circuit board 300 may receive the communication module 190. The configuration of the communication module 190 of FIG. 6 may be identical in whole or part to the configuration of the communication module 190 of FIG. 1, and the configuration of the circuit board 300 of FIG. 6 may be identical in whole or part to the configuration of the printed circuit board 240 of FIG. 4.

According to various embodiments, the circuit board 300 may face the antenna assembly (e.g., the antenna assembly 400 of FIG. 5A). For example, the circuit board 300 may include a first circuit board surface 300*a* facing the first surface (e.g., the first surface 400*a* of FIG. 5A) of the antenna assembly 400.

According to various embodiments, the circuit board 300 may electrically connect the communication module 190 with the antenna assembly (e.g., the antenna assembly 400 of FIG. 5A). For example, the circuit board 300 may include a first connection part 310 electrically connected with the communication module 190 using wiring (not shown). According to an embodiment, the first connection part 310 may be electrically connected with the antenna pattern 410 (e.g., the antenna pattern 410 of FIG. 5B). For example, the first connection part 310 may contact a first connection area (e.g., the first connection area 415 of FIG. 5A) of the antenna pattern 410. According to an embodiment, the first connection part 310 may be a C-clip.

According to various embodiments, the circuit board 300 may provide a reference potential to the antenna assembly (e.g., the antenna assembly 400 of FIG. 5B). For example, the circuit board 300 may include a second connection part 320 electrically connected with the ground pattern (e.g., the ground pattern 420 of FIG. 5B) of the antenna assembly 400. According to an embodiment, the second connection part 320 may contact the second connection area (e.g., the second connection area 425 of FIG. 5A) of the ground pattern 420. According to an embodiment, the second connection part 320 may be a C-clip.

Figure 7:
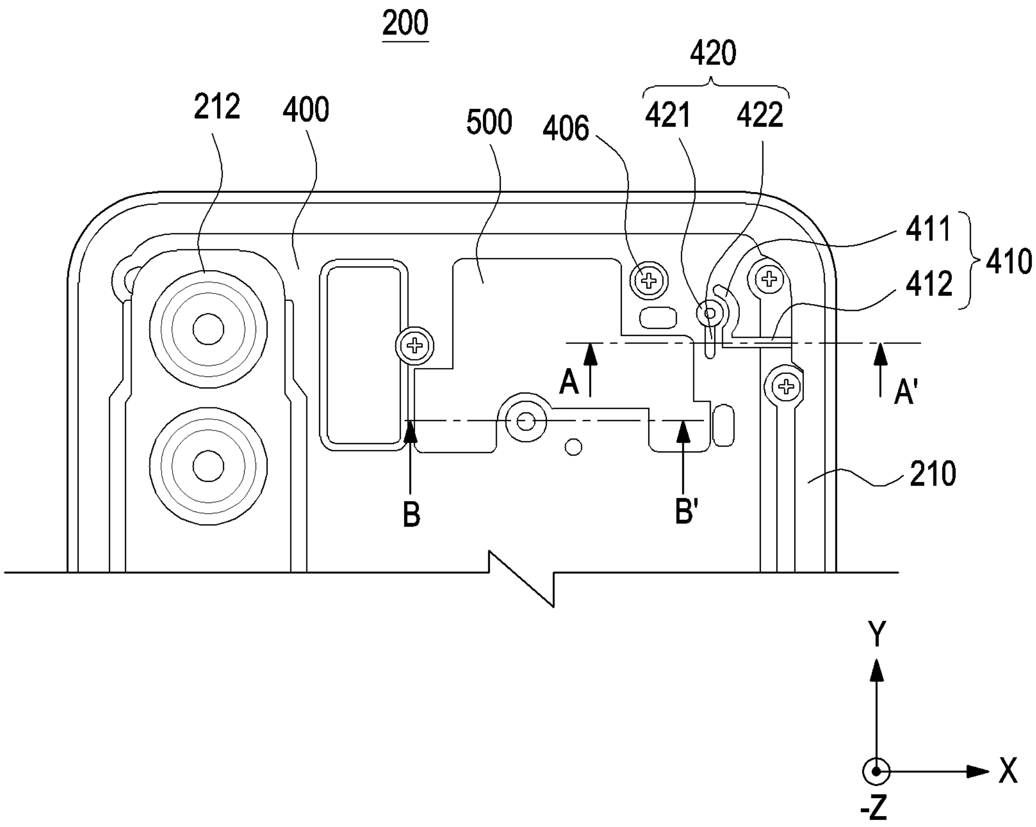
FIG. 7 is a rear view illustrating an electronic device except for a rear plate, according to an embodiment of the disclosure.
Figure 8:
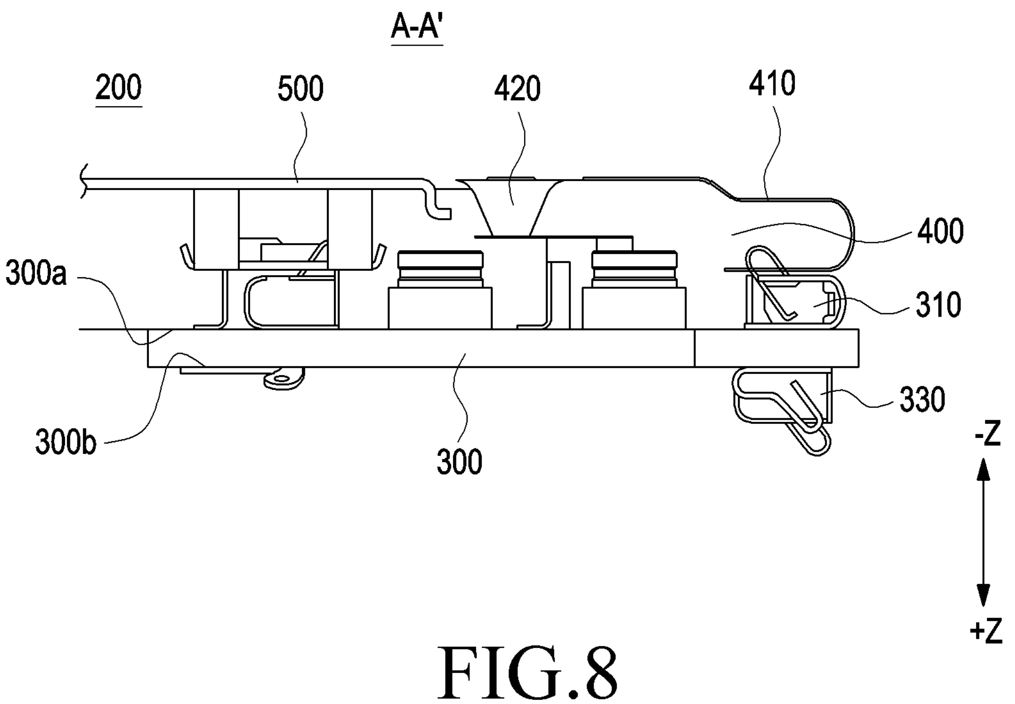
FIG. 8 is a cross-sectional view taken along line A-A' of FIG. 7 according to an embodiment of the disclosure.
Figure 9:
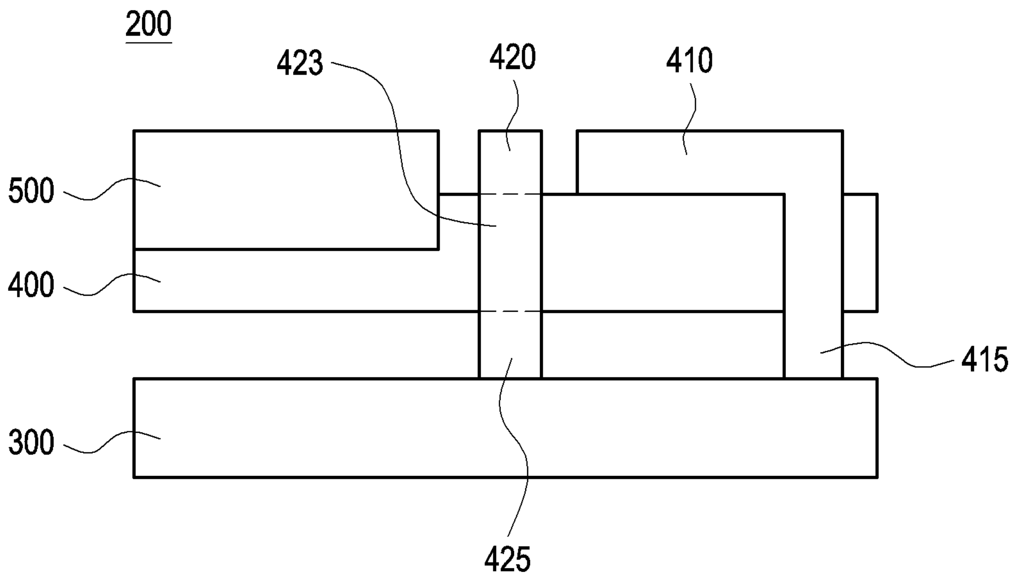
FIG. 9 is a schematic cross-sectional view illustrating an arrangement structure of an antenna assembly, a plate, and a circuit board according to an embodiment of the disclosure.
Figure 10:
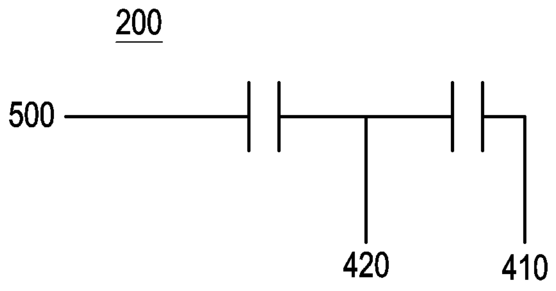
FIG. 10 is a schematic view illustrating an electrical connection relationship between an antenna assembly, a ground, and an antenna pattern according to an embodiment of the disclosure.

FIG. 7 is a rear view illustrating an electronic device except for a rear plate, according to an embodiment of the disclosure. FIG. 8 is a cross-sectional view taken along line A-A' of FIG. 7 according to an embodiment of the disclosure. FIG. 9 is a schematic cross-sectional view illustrating an arrangement structure of an antenna assembly, a plate, and a circuit board according to an embodiment of the disclosure. FIG. 10 is a schematic view illustrating an electrical connection relationship between an antenna assembly, a ground, and an antenna pattern according to an embodiment of the disclosure.

Referring to FIGS. 7, 8, 9, and/or 10, an electronic device 200 may include a circuit board 300, an antenna assembly 400, and a plate 500. The configuration of the circuit board 300 of FIGS. 7, 8, 9 and/or 10 may be identical in whole or part to the configuration of the circuit board 300 of FIG. 6, and the configuration of the antenna assembly 400 and the plate 500 of FIGS. 7, 8, 9, and/or 10 may be identical in whole or part to the configuration of the antenna assembly 400 and the plate 500 of FIG. 5B.

According to various embodiments, the circuit board 300, the antenna assembly 400, and the plate 500 may be disposed in the housing 210. For example, the antenna assembly 400 and/or the circuit board 300 may be coupled to the bracket (e.g., the bracket 232 of FIG. 4) of the housing 210 using at least one fastening member 406.

According to various embodiments, the plate 500 may communicate with an electronic device (e.g., the external electronic device 104 of FIG. 1) or a server (e.g., the server 106 of FIG. 1) outside the electronic device 200. According to an embodiment, the plate 500 may be electrically connected or coupled with the antenna pattern 410 through the ground pattern 420. For example (e.g., FIG. 10), the ground pattern 420 may be electrically connected or coupled with the antenna pattern 410, and the plate 500 may be electrically connected or coupled with the ground pattern 420. For example, the plate 500 may generate a signal coupling with the antenna pattern 410 and may function as a dual coupling antenna. According to an embodiment, the plate 500, together with the antenna pattern 410, may radiate radio signals to the outside of the electronic device 200 or receive the radio signal transferred from the outside of the electronic device 200. According to an embodiment, the ground pattern 420 may be positioned between the antenna pattern 410 and the plate 500. According to an embodiment, the antenna pattern 410, the ground pattern 420, and the plate 500 may be positioned adjacent to each other to create dual coupling. According to an embodiment, the antenna pattern 410, the ground pattern, and the plate 500 may be disposed to be spaced apart from each other.

According to various embodiments, the antenna pattern 410 may include a first antenna area 411 facing at least a portion of the ground pattern 420. According to an embodiment, the first antenna area 411 may be disposed to be spaced apart from the ground pattern 420. For example, the first antenna area 411 may be spaced apart from the ground pattern 420 and may surround at least a portion of the ground pattern 420. According to an embodiment, the first antenna area 411 may be electrically connected with the ground pattern 420.

According to various embodiments, the antenna pattern 410 may include a second antenna area 412 extending from the first antenna area 411. According to an embodiment, the second antenna area 412 may extend from the second surface (e.g., the second surface 400*b* of FIG. 5B) of the antenna assembly 400 through a side surface of the antenna assembly 400 to the first connection area 415 positioned on the first surface (e.g., the first surface 400*a* of FIG. 5A) of the antenna assembly 400.

According to various embodiments, the ground pattern 420 may include a first ground area 421. According to an embodiment, the first ground area 421 may be formed in a closed loop shape. According to an embodiment, at least a portion of the first ground area 421 may be connected with a ground via 423. According to an embodiment, the ground pattern 420 may include a second ground area 422 extending from the first ground area 421. According to an embodiment, the second ground area 422 may be electrically connected with at least a portion (e.g., the first antenna area 411) of the antenna pattern 410 and the plate 500. For example, the plate 500 may be electrically coupled with the antenna pattern 410 using the second ground area 422.

According to various embodiments, the ground pattern 420 may include a ground via 423 positioned inside the antenna assembly 400. According to an embodiment, the ground pattern 420 may be connected with the second connection area 425 using the ground via 423. According to an embodiment, the ground via 423 and/or the second connection area 425 may be interpreted as a part of the ground pattern 420.

According to an embodiment, the electronic device 200 may include the camera module 212, at least a portion of which is positioned in the through hole (e.g., the through hole 404 of FIG. 5B) of the antenna assembly 400.

According to various embodiments, the circuit board 300 may face the antenna assembly 400. For example, the circuit board 300 may include a first circuit board surface 300*a* facing the antenna assembly 400 and a second circuit board surface 300*b* opposite to the first circuit board surface 300*a*. According to an embodiment, the circuit board 300 may include a first connection part 310 disposed on the first circuit board surface 300*a*. The first connection part 310 may contact at least a portion (e.g., the second antenna area 412) and/or the first connection area 415 of the antenna pattern 410. According to an embodiment, the circuit board 300 may include a third connection part 330 disposed on the second circuit board surface 300*b*. The circuit board 300 may be electrically connected with a component (e.g., an antenna positioned in the housing 210) of the electronic device 200 using the third connection part 330.

Figure 11:
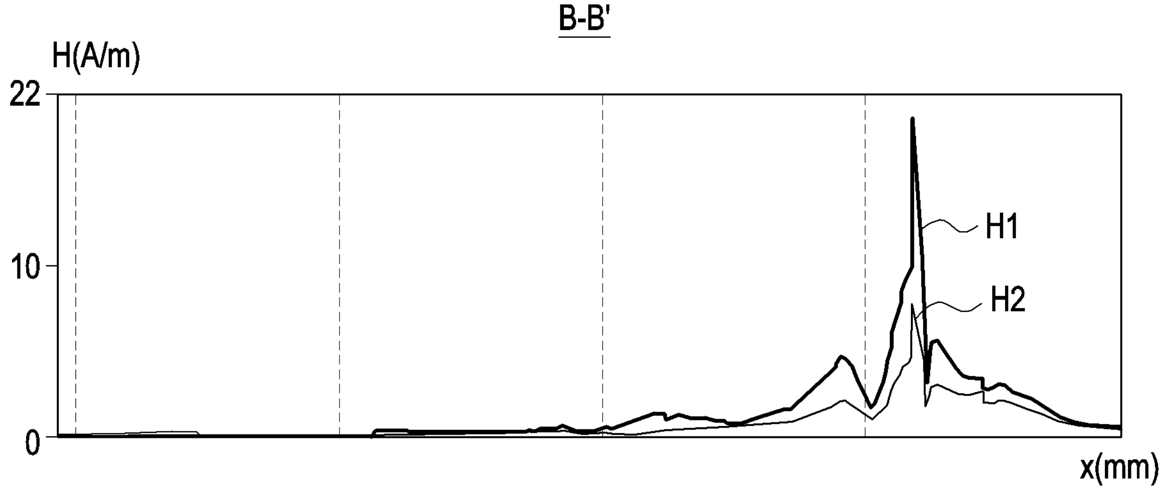
FIG. 11 is a graph illustrating a magnetic field of a B-B' plane of FIG. 7 according to an embodiment of the disclosure.
Figure 12:
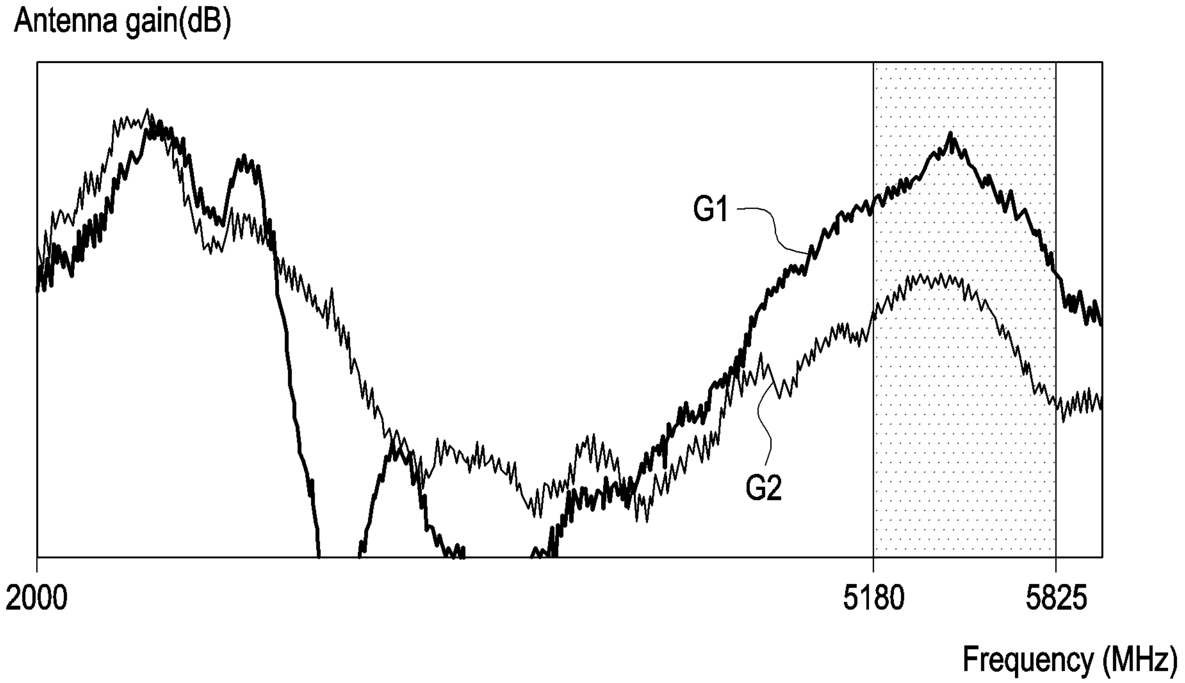
FIG. 12 is a graph illustrating an antenna gain of an electronic device including a plate according to an embodiment of the disclosure.

FIG. 11 is a graph illustrating a magnetic field of a B-B' plane of FIG. 7 according to an embodiment of the disclosure. For example, the X axis of FIG. 11 denotes the position of the electronic device (e.g., the electronic device 200 of FIG. 7) on the B-B' plane of FIG. 7, and the Y axis of FIG. 11 denotes the magnetic field (H-field). FIG. 12 is a graph illustrating an antenna gain of an electronic device including a plate according to an embodiment of the disclosure.

Referring to FIGS. 11 and 12, the X axis of FIG. 12 denotes the frequency (MHz) of the electronic device 200, and the Y axis of FIG. 12 denotes the antenna gain of the electronic device 200.

According to various embodiments (e.g., FIG. 11), the first magnetic field (H-field) H1 of the electronic device 200 may be substantially larger than the second magnetic field H2 of an electronic device (not shown) that does not use the plate 500 as an antenna. The first magnetic field H1 may be interpreted as a magnetic field generated by the electronic device 200 including a ground pattern (e.g., the ground pattern 420 of FIG. 5B) positioned between the antenna pattern 410 and the plate 500. For example, the first magnetic field H1 may be strengthened by the ground pattern 420 and/or the plate 500. The second magnetic field H2 may be interpreted as a magnetic field generated by an electronic device (not shown) that does not include the ground pattern 420.

According to an embodiment, the antenna performance of the electronic device 200 including the plate 500 electrically connected with the antenna pattern 410 through the ground pattern 420 may be larger than the antenna performance of the electronic device (not shown) that does not use the plate 500 as an antenna.

According to various embodiments (e.g., FIG. 12, Tables 1 and 2), in a designated frequency band (e.g., 5180 MHz to 5825 MHz), the first antenna gain G1 of the electronic device 200 may be larger than the second antenna gain G2 of the electronic device (not shown) that does not use the plate 500 as an antenna. The first antenna gain G1 may be interpreted as the antenna gain of the electronic device 200 including a ground pattern (e.g., the ground pattern 420 of FIG. 5B) positioned between the antenna pattern 410 and the plate 500. For example, the first antenna gain G1 may be enhanced by the ground pattern 420 and/or the plate 500. The antenna gain may include total radiated power (TRP) and/or total isotropic sensitivity (TIS).

The second antenna gain G2 may be interpreted as the antenna gain of an electronic device (not shown) that does not include the ground pattern 420.

TABLE 1

| Passive antenna gain (dBi) | 44 ch (5220 MHz) | 100 ch (5500 MHz) | 157 ch (5805 MHz) |
|---|---|---|---|
| G1 | −7.7 | −6.5 | −9.5 |
| G2 | −10.7 | −10.5 | −13.5 |
| Degree of enhancement | 3 dB | 4 dB | 4 dB |

TABLE 2

| Active antenna | 44ch (5220 MHz) | | 100ch (5500 MHz) | | 157ch) (5805 MHz | |
|---|---|---|---|---|---|---|
| gain (dBm) | TRP | TIS | TRP | TIS | TRP | TIS |
| G1 | 12.5 | −88.1 | 12.8 | −85.8 | 11.0 | −85.7 |
| G2 | 7.2 | −82.4 | 7.12 | −80.6 | 7.6 | −81.9 |
| Degree of enhancement | 5.3 | 5.7 | 5.7 | 5.2 | 3.4 | 3.8 |

According to various embodiments of the disclosure, an electronic device (e.g., the electronic device 200 of FIG. 2) may comprise a housing (e.g., the housing 210 of FIG. 2), a circuit board (e.g., the circuit board 300 of FIG. 6) disposed in the housing and receiving a communication module (e.g., the communication module 190 of FIG. 1), an antenna assembly (e.g., the antenna assembly 400 of FIG. 5B) disposed in the housing and including an antenna pattern (e.g., the antenna pattern 410 of FIG. 5B) and a ground pattern (e.g., the ground pattern 420 of FIG. 5B) electrically connected with the communication module, and a conductive plate (e.g., the plate 500 of FIG. 5B) disposed on the antenna assembly. At least a portion of the ground pattern may be positioned between the antenna pattern and the plate. The plate may be configured to be electrically coupled with the antenna pattern through the ground pattern.

According to various embodiments, the plate may be configured to radiate at least a portion of a radio signal generated from the antenna pattern to an outside of the electronic device.

According to various embodiments, the electronic device may further comprise a speaker module (e.g., the speaker module 290 of FIG. 5A) disposed in the housing and facing at least a portion of the plate.

According to various embodiments, at least a portion of a sound generated from the speaker module may be transferred to a resonance space (e.g., the resonance space 292 of FIG. 5A) facing the speaker module. The plate, together with the speaker module, may surround at least a portion of the resonance space.

According to various embodiments, the antenna assembly may include a first surface (e.g., the first surface **400*a* of FIG. 5A) facing the circuit board and a second surface (e.g., the second surface 400*b* of FIG. 5**B) opposite to the first surface. At least a portion of the antenna pattern and at least a portion of the ground pattern may be disposed on the second surface.

According to various embodiments, the antenna assembly may include a first connection area (e.g., the first connection area 415 of FIG. 5A) configured to extend from the antenna pattern and be electrically connected with the communication module.

According to various embodiments, the antenna assembly may include a second connection area (e.g., the second connection area 425 of FIG. 5A) extending from the ground pattern and connected with the circuit board.

According to various embodiments, the plate may be disposed on the second surface.

According to various embodiments, the circuit board may include a first connection part (e.g., the first connection part 310 of FIG. 6) configured to be connected with the communication module and the antenna pattern.

According to various embodiments, the circuit board may include a second connection part (e.g., the second connection part 320 of FIG. 6) configured to be connected with the ground pattern.

According to various embodiments, the antenna pattern may include a first antenna area (e.g., the first antenna area 411 of FIG. 7) spaced apart from the ground pattern and surrounding at least a portion of the ground pattern and a second antenna area (e.g., the second antenna area 412 of FIG. 7) extending from the first antenna area.

According to various embodiments, the ground pattern may include a first ground area (e.g., the first ground area 421 of FIG. 7) in a closed loop shape and a second ground area (e.g., the second ground area 422 of FIG. 7) extending from the first ground area.

According to various embodiments, the antenna pattern may include at least one of copper or nickel. The antenna assembly may include a case structure (e.g., the case structure 402 of FIG. 5B) receiving at least a portion of the antenna pattern and including a resin.

According to various embodiments, the plate may include at least one of stainless steel, aluminum, copper, or nickel.

According to various embodiments, the electronic device may further comprise a display (e.g., the display 220 of FIG. 3) at least partially disposed in the housing and a battery (e.g., the battery 250 of FIG. 3) disposed in the housing and configured to supply power to the communication module.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
- a housing;
- a circuit board disposed in the housing and receiving a communication module;
- an antenna assembly disposed in the housing, wherein the antenna assembly includes an antenna pattern electrically connected with the communication module and a ground pattern; and
- a conductive plate disposed on the antenna assembly,
- wherein at least a portion of the ground pattern is positioned between the antenna pattern and the conductive plate, and
- wherein the conductive plate is configured to be electrically coupled with the antenna pattern through the ground pattern.

2. The electronic device of claim 1, wherein the conductive plate is further configured to radiate at least a portion of a radio signal generated from the antenna pattern to an outside of the electronic device.

3. The electronic device of claim 1, further comprising a speaker module disposed in the housing and facing at least a portion of the conductive plate.

4. The electronic device of claim 3,
- wherein at least a portion of a sound generated from the speaker module is transferred to a resonance space facing the speaker module, and
- wherein the conductive plate, together with the speaker module, surrounds at least a portion of the resonance space.

5. The electronic device of claim 1,
- wherein the antenna assembly includes a first surface facing the circuit board and a second surface opposite to the first surface, and
- wherein at least a portion of the antenna pattern and at least a portion of the ground pattern are disposed on the second surface.

6. The electronic device of claim 5, wherein the antenna assembly includes a first connection area configured to extend from the antenna pattern and be electrically connected with the communication module.

7. The electronic device of claim 5, wherein the antenna assembly includes a second connection area extending from the ground pattern and connected with the circuit board.

8. The electronic device of claim 5, wherein the conductive plate is disposed on the second surface.

9. The electronic device of claim 1, wherein the circuit board includes a first connection part configured to be connected with the communication module and the antenna pattern.

10. The electronic device of claim 1, wherein the circuit board includes a second connection part configured to be connected with the ground pattern.

11. The electronic device of claim 1, wherein the antenna pattern includes:
- a first antenna area spaced apart from the ground pattern and surrounding at least a portion of the ground pattern, and
- a second antenna area extending from the first antenna area.

12. The electronic device of claim 1, wherein the ground pattern includes a first ground area in a closed loop shape and a second ground area extending from the first ground area.

13. The electronic device of claim 1,
- wherein the antenna pattern includes at least one of copper or nickel, and
- wherein the antenna assembly includes a case structure receiving at least a portion of the antenna pattern and including a resin.

14. The electronic device of claim 1, wherein the conductive plate includes at least one of stainless steel, aluminum, copper, or nickel.

15. The electronic device of claim 1, further comprising:
- a display at least partially disposed in the housing; and
- a battery disposed in the housing and configured to supply power to the communication module.

16. An electronic device comprising:

a housing;

a circuit board disposed in the housing and receiving a communication module;

an antenna assembly disposed in the housing and including an antenna pattern electrically connected with the communication module and a ground pattern spaced apart from the antenna pattern;

a speaker module disposed on a first surface of the antenna assembly; and a conductive plate disposed on a second surface, opposite to the first surface, of the antenna assembly and, together with the speaker module, surrounding at least a portion of a resonance space, wherein at least a portion of the ground pattern is positioned between the antenna pattern and the conductive plate, and wherein the conductive plate is configured to be electrically coupled with the antenna pattern through the ground pattern.

17. The electronic device of claim 16, wherein the conductive plate is further configured to radiate at least a portion of a radio signal generated from the antenna pattern to an outside of the electronic device.

18. The electronic device of claim 16, wherein the first surface faces the circuit board, and wherein at least a portion of the antenna pattern and at least a portion of the ground pattern are disposed on the second surface.

19. The electronic device of claim 16, wherein the antenna assembly includes:

a first connection area configured to extend from the antenna pattern and be electrically connected with the communication module; and a second connection area extending from the ground pattern and connected with the circuit board.

20. The electronic device of claim 16, wherein the antenna pattern includes a first antenna area spaced apart from the ground pattern and surrounding at least a portion of the ground pattern and a second antenna area extending from the first antenna area, and wherein the ground pattern includes a first ground area in a closed loop shape and a second ground area extending from the first ground area.

* * * * *